(12) United States Patent
Abbruzzese

(10) Patent No.: US 8,863,223 B2
(45) Date of Patent: Oct. 14, 2014

(54) MOBILE SET TOP BOX

(75) Inventor: Jared E. Abbruzzese, Jupiter, FL (US)

(73) Assignee: MV3 Partners LLC, Lake Worth, FL (US)

( * ) Notice: Subject to any disclaimer, the term of this patent is extended or adjusted under 35 U.S.C. 154(b) by 0 days.

(21) Appl. No.: 12/576,391

(22) Filed: Oct. 9, 2009

(65) Prior Publication Data

US 2010/0169935 A1 Jul. 1, 2010

Related U.S. Application Data

(60) Provisional application No. 61/142,190, filed on Dec. 31, 2008.

(51) Int. Cl.
*H04N 7/16* (2011.01)
*G11B 5/584* (2006.01)
*H04N 21/4402* (2011.01)
*H04N 21/482* (2011.01)
*H04N 21/472* (2011.01)
*H04N 21/414* (2011.01)
*H04N 21/4363* (2011.01)

(52) U.S. Cl.
CPC ........ *G11B 5/584* (2013.01); *H04N 21/440218* (2013.01); *H04N 21/482* (2013.01); *H04N 21/47202* (2013.01); *H04N 21/440263* (2013.01); *H04N 21/41407* (2013.01); *H04N 21/43637* (2013.01)
USPC ........... 725/153; 725/100; 725/151; 348/441; 348/458; 345/1.1; 345/3.3

(58) Field of Classification Search
USPC .......................................... 725/153; 345/3.3
See application file for complete search history.

(56) References Cited

U.S. PATENT DOCUMENTS

| 6,141,436 | A | * | 10/2000 | Srey et al. ...................... 382/124 |
| 6,922,843 | B1 | * | 7/2005 | Herrington et al. ............. 725/30 |
| 7,143,432 | B1 | * | 11/2006 | Brooks et al. .................. 725/105 |
| 7,221,901 | B2 | | 5/2007 | Watanabe |
| 7,305,250 | B2 | * | 12/2007 | Choi ........................... 455/550.1 |

(Continued)

FOREIGN PATENT DOCUMENTS

| EP | 0999678 | 5/2000 |
| EP | 1307062 | 5/2003 |

(Continued)

OTHER PUBLICATIONS

FriendTech Inc: "Introducing PhoneTV", Mar. 26, 2008, pp. 1-18, XP002563700, retrieved from archive.org Apr. 12, 2008: http://web.archive.org/web/20080412020327/http://www.friendtech.com/pages/PhoneTV.htm (also included in IDS).*

(Continued)

*Primary Examiner* — Robert Hance
(74) *Attorney, Agent, or Firm* — Fish & Richardson P.C.

(57) ABSTRACT

A system is provided in which IP or media content residing on or being streamed to a mobile phone is forwarded to a display. The media content supports a native resolution of the mobile phone that is significantly smaller than a native resolution of said display. The system has media content processing circuitry, which up-scales the media content to the display native resolution. The system forwards the up-scaled media content to the display, whereby the display provides the up-scaled media content to a viewer.

61 Claims, 4 Drawing Sheets

(56) References Cited

U.S. PATENT DOCUMENTS

| | | | |
|---|---|---|---|
| 2002/0190920 A1* | 12/2002 | Kung | 345/3.1 |
| 2004/0249962 A1 | 12/2004 | Lecomte | |
| 2005/0100162 A1 | 5/2005 | Alve et al. | |
| 2006/0179452 A1 | 8/2006 | Amodeo et al. | |
| 2006/0203758 A1* | 9/2006 | Tee et al. | 370/315 |
| 2006/0271977 A1* | 11/2006 | Lerman et al. | 725/88 |
| 2007/0139513 A1 | 6/2007 | Fang | |
| 2007/0297513 A1* | 12/2007 | Biswas et al. | 375/240.16 |
| 2008/0022298 A1 | 1/2008 | Cavicchia | |
| 2008/0115180 A1 | 5/2008 | Casavant et al. | |
| 2008/0198264 A1* | 8/2008 | Balram | 348/459 |
| 2008/0207262 A1 | 8/2008 | Shimizu | |
| 2009/0046995 A1* | 2/2009 | Kanumuri et al. | 386/114 |
| 2009/0086109 A1* | 4/2009 | Onomatsu | 348/731 |
| 2009/0164688 A1* | 6/2009 | Wright-Riley | 710/303 |
| 2009/0178097 A1* | 7/2009 | Kim et al. | 725/114 |
| 2009/0284652 A1* | 11/2009 | Bennett et al. | 348/441 |
| 2010/0220250 A1* | 9/2010 | Vanderwall et al. | 348/837 |

FOREIGN PATENT DOCUMENTS

| | | |
|---|---|---|
| EP | 1715691 | 10/2006 |
| EP | 1895775 | 3/2008 |
| EP | 1983756 | 10/2008 |
| EP | 1998308 | 12/2008 |
| GB | 2437584 | 4/2006 |
| WO | 0117254 | 3/2001 |
| WO | 0197495 | 12/2001 |
| WO | 03032504 | 4/2003 |
| WO | 03047202 | 6/2003 |
| WO | 2004036923 | 4/2004 |
| WO | 2006130273 | 12/2006 |
| WO | 2008070339 | 6/2008 |
| WO | 2008136620 | 11/2008 |

OTHER PUBLICATIONS

Friendtech Inc.: "Introducing PhoneTV", Mar. 26, 2008, pp. 1-18, XP002563700, retrieved from the Internet: URL http://www.friendtech.com/files/PhoneT V(Introduction).pdf>, retrieved on Jan. 15, 2010.

International Search Report, Jan. 29, 2010, for PCT/US2009/005536.

The People's Republic of China Notification of the First Office Action (with English translation) for Application No. 200980156495.4 dated Jul. 4, 2013, 9 pages.

* cited by examiner

MOBILE SET TOP BOX

CONTINUITY

This application claims priority to U.S. Provisional Patent Application No. 61/142,190, filed on Dec. 31, 2008, the disclosure of which is incorporated herein by reference.

BACKGROUND

1. Field of the Invention

The invention described herein relates to a mobile set top box for receiving content and reformatting for and sending to a display the content for viewing.

2. Background of the Prior Art

Television and internet users access content available over cable, satellite and Internet networks. Each of those networks transmits content over the networks and allows the users to view the content on a television or computer screens.

With respect to televisions, television users commonly access content using a set top box. The box is a dedicated computing device that serves as an interface between a display and a broadband network. A common set top box is a cable or satellite set top box found in homes with a cable or satellite television connection. The set top box receives a television signal over the cable lines or from a satellite dish, reformats the data in the signal and sends to a television the data for display by the television. The set top box also allows a television viewer to access content such as on-screen programming guides, interactive content such as home or auto advertisements, games or on-demand movies.

Set top boxes, however, have limitations. For example, set top boxes can be used only with the network that provides the boxes. For example, a set top box provided by Verizon FIOS can not be used on a Comcast cable network. Moreover, content output from set top boxes can only be viewed on devices which are capable of receiving TV signals.

With respect to computers, Internet users commonly access content using a desktop or laptop computer. While Internet access points are available in many locations, many computer users will not transport their desktop computers between locations. Laptop computer users often transport their laptops and some laptop users have a modem card that allows them to access the Internet over a wireless network such as Verizon's, Sprint's or AT&T's wireless networks. The laptop computers, however, usually only allow the users to view the content on the laptop screen or another computer peripheral.

Other mobile computing devices such as mobile telephones are available, but they also have limitations regarding content access. For example, along with wireless phone service, many wireless providers such as Verizon, Sprint and AT&T also provide the ability to access content over the Internet or content from the providers such as through Verizon's V Cast service.

Today, a mobile computer device such as a mobile phone, PDA or Smartphone is the primary device people use to connect wirelessly. Broadband data cards provided by wireless carriers are growing in use, but the numbers of such cards are a fraction of the number of mobile phones being used for voice and data communications. Although there are many reasons for this, a major factor is the size of the mobile phone/PDA device.

Various prior art references have attempted to harness the abilities of known mobile phones. A specific example is International Publication Number WO 03/032504, for Methods and Systems of Wireless Communication Between a Remote Data Network and a Set-Top Box. This publication is directed to the field of wireless data transmission and reception. The invention disclosed therein particularly relates to a data transmission and reception system including systems and methods for using a wireless telephone to receive and transmit packet signals via a wireless or cellular network for display on a standard television using a set-top box.

The disclosure of this reference is directed to a location-specific implementation, replacing the distribution network for traditional set-top boxes in those locations where there is no wireline system. For example, the reference teaches that "there is a need for a system that provides Internet access to areas where landline telephone networks do not exist or are unreliable."

A further example is International Publication Number WO 08/136620 for a Method and System for Receiving Digital Broadcasting by Using Mobile Communication Terminal. The disclosure is related to "a system and method for receiving digital broadcasts by using a mobile communication terminal. More particularly, the invention relates to a system and a method for receiving digital broadcasts by connecting a digital broadcast receiving device to a mobile communication terminal so that the mobile communication terminal replaces circuits of the digital broadcast receiving device . . . ."

The disclosure of this reference indicates that its invention is limited to displaying over-the-air signals on a mobile terminal. This is accomplished by moving direct digital broadcast signals (e.g. DBS) that would normally be received by an antenna and set top box with the same technology.

Mobile computing devices have limitations not recognized in the cited references. Many mobile computing devices can not be connected to large display monitors. Furthermore, many wireless networks have low bandwidth in comparison to Internet, cable or satellite transmissions systems. Based on available bandwidth considerations and processing power of a particular mobile computing device, content transferred to a mobile computing device is typically sized to fit only the mobile computing device.

For example, the bandwidth of a mobile phone communicating over an Enhanced Data GSM Environment (EDGE) network, which is the protocol utilized by many Smartphones in the United States, is sufficient to support streaming content encoded for QVGA (Quarter Video Graphics Array) resolution, which may be the native resolution for a given Smartphone. However, this bandwidth is not nearly enough for supporting video at, for example, 1080p resolution (full HD), which may be the native resolution for a target display.

It can be appreciated that streaming low-resolution video from a cellular phone to an HD-TV has not been a reasonable option. However, as mobile phones approach global ubiquity, and as 3G and 4G networks as well as WiFi and WiMax begin to proliferate, the availability of high-speed wireless data transmission networks anywhere is near.

Accordingly, there is a need for a mobile set top box that combines the functionality of a set top box and a mobile communication system such that content normally available at discrete locations can be available any time, any where a user seeks access to such content.

In addition, there is a further need to enable the mobile set top box to up-convert content intended for a mobile computer device, such as a mobile phone, so that the content is properly viewed on a larger display, such as a large screen HD-TV.

SUMMARY OF THE INVENTION

The present inventions solve the aforementioned problems by providing a mobile set top box that acts as a conduit between disparate data networks and display devices.

An object of the invention is to provide a mobile set top box for gaining access to mobile content through broadband networks as well as standard over-the-air distribution.

Another object of the invention is to provide a mobile set top box that leverages the versatility of the widely accepted mobile phone/PDAs and, when combined with the mobile phones/PDAs, is used as an integrator for projection of content and interaction. This includes leveraging the cell carriers, as well as WiFi, WiMAX, and MSS (Mobile Satellite Services) networks.

Another object of the invention is to provide a mobile set top box which is capable of authenticating a user so that the user can receive media service.

Another object of the invention to provide a mobile set top box which has the ability to receive programming information via a cellular or other network, receive a selection of real time or stored video and audio from a user, and perform up-conversions to display the media configured for a mobile computing device, such as a cellular phone, on a large screen HD-TV.

Another object of the invention is to provide a mobile set top box which receives, as an intermediate component, video and audio received from cellular or other networks.

Another object of the invention is to provide a mobile set top box which enables a user to "surf channels".

In addition to decoding and rendering broadcast TV signals, another object of the invention is to provide a mobile set top box which is capable of processing video-on-demand (VOD), Electronic Program Guide (EPG), digital rights management (DRM), and a variety of interactive and multimedia services.

More specifically, a system is provided in which media content residing on or being streamed to a mobile phone is forwarded to a display. The media content supports a native resolution of the mobile phone that is significantly smaller than a native resolution of said display. The system has media content processing circuitry, which up-scales the media content to the display native resolution. The system forwards the up-scaled media content to the display, whereby the display provides the up-scaled media content to a viewer.

BRIEF DESCRIPTION OF THE FIGURES

The accompanying drawings illustrate the inventions described herein and, together with the Detailed Description below, help to describe the inventions. The reference numerals in the drawings refer to the same or like elements and are used in the Detailed Description to refer to the same or like elements. Below are brief descriptions of the drawings.

DESCRIPTION OF THE EMBODIMENTS

Figure 1:
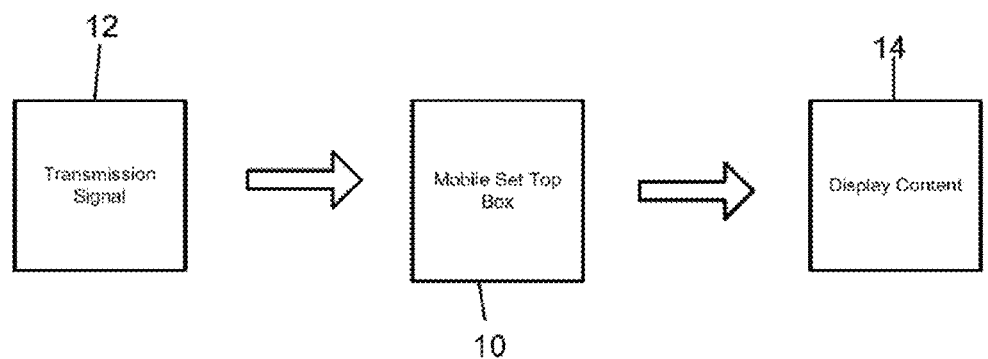
FIG. 1 illustrates an overview of the disclosed embodiment of the invention.

FIG. 1 depicts a concept used in the present inventions. A mobile set top box 10 serves as an intermediate device between disparate transmission networks 12 and disparate display devices 14. Using the mobile set top box 10, users will access content from content providers over the transmission networks 12 and then use the mobile set top box 10 to display on disparate displays 14 the content.

The mobile set top box 10 can have access to one or various communication networks, and can be capable of processing protocols provided over such networks, such as the networks and protocols listed in Appendix A, attached hereto. For example, properly configured, a mobile communication device can have access to data distributed via systems implementing ATSC technologies, IP technologies, satellite technologies and/or WiFi technologies.

In addition, unlike traditional set top boxes, the present inventions can reformat content to fit any display. The mobile set top box 10 is capable of determining the size format of the content received by the mobile set top box 10, the size format capable of being displayed by the display device 14, and performing proper up- or down-conversions for properly displaying the content on the display device 14.

That is, the mobile set top box 10 processes data meant for any size mobile computing device 10, such as a mobile phone with a three inch screen, i.e., the native resolution for the computing device 10, such that the content is capable of being properly viewed on any visual display, i.e., the native resolution for the display device 14, such as a large screen HD-TV, a computer monitor or a projector.

In other words, the mobile set top box 10 is capable of navigating the full matrix of all forms of transmission signals, all forms of protocols provided by the transmissions (many of which are listed in Appendix A) and all forms of display types.

Moreover, up-scaling video from a mobile phone can be accomplished utilizing, for example, the "single frame super resolution LSI 'µPD9245GJ' chip", available from NEC Corporation, which is capable of up-scaling image data from, e.g., QVGA resolution, typically found on a mobile phone, to SXGA (Super eXtended Graphics Array) and large screen HD (High Definition Television) resolutions.

While the descriptions above and below illustrate the present inventions in connection with a mobile phone, one of skill in the art will understand the present inventions can be applied in other scenarios. For example, one of skill in the art will understand the present inventions can be applied to other mobile computing devices such as laptop computers or GPS devices.

Figure 2:
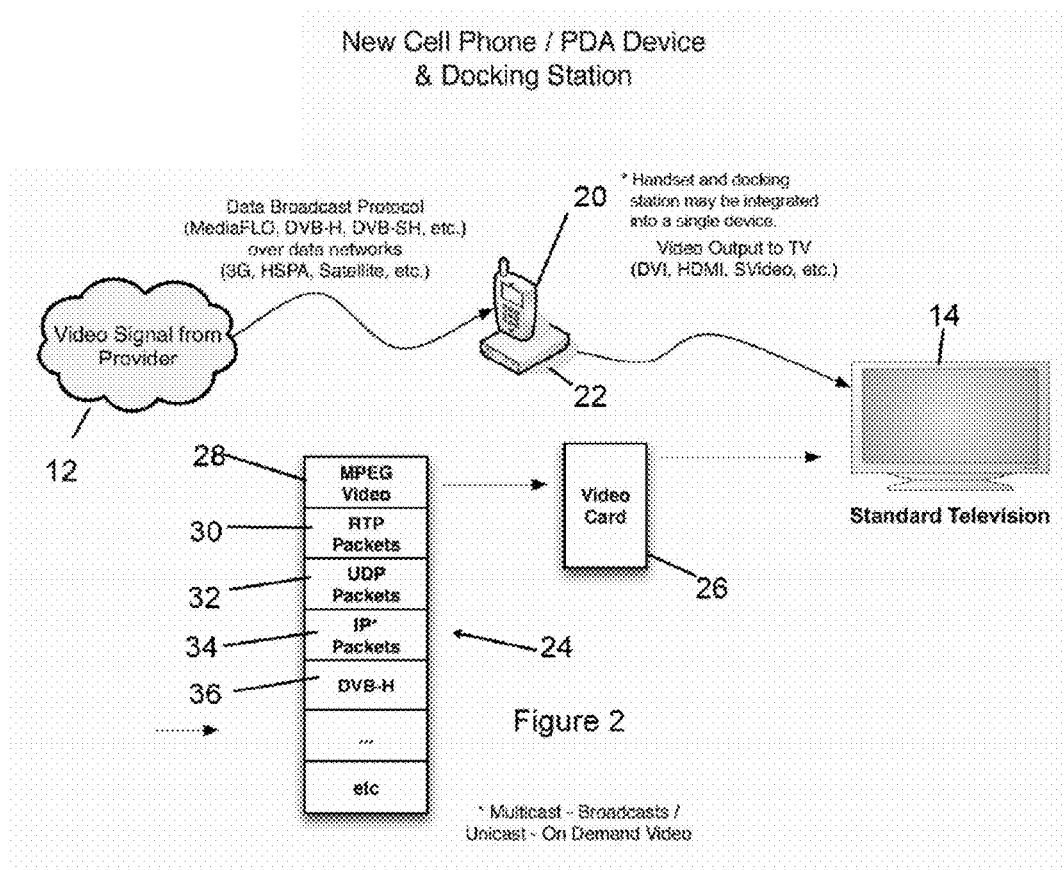
FIG. 2 illustrates an implementation of the disclosed embodiment of the invention in which the mobile set top box and the docking station are two disparate devices, as compared with implementations, within the scope of the invention, in which they are combined.

FIG. 2 illustrates an implementation of the present inventions. The mobile set top box 10 is illustrated as a mobile phone 20 and a docking station 22. As illustrated, the cellular phone 20 merely passes information to the docking station 22 and is controlled by the docking station 22. However, the functionality of the mobile set top box 10 can be in either device. In addition, the mobile phone 20 and docking station 22 can be combined into one device. Furthermore, the display 14 is illustrated as a standard television.

As illustrated, media signals 12 from the user's cellular provider are sent to the user's mobile phone 20 and thereafter communicated to the docking station 22. The protocols which are provided over typical networks and which the mobile phone 20 is capable of receiving include, for example Media-FLO (Forward Link Only), DVB-H (Digital Video Broadcasting-Handheld), DVB-SH (Digital Video Broadcasting-Satellite services to Handhelds), and HSPA (High Speed Packet Access). Furthermore, the mobile phone 20 is capable of communicating over various networks, such as 3G, satellite, etc. Other applicable protocols and communication networks are listed in Appendix A, attached hereto.

Furthermore, converting 3GP, the multimedia container format defined by the Third Generation Partnership Project (3GPP) for 3G UMTS (Universal Mobile Telecommunications System) multimedia services to other video formats, such as MPEG-4, and/or between any of the formats listed in Appendix A, can be performed in the mobile set top box 10 through the use of readily available software and/or hardware encoders.

FIG. 2 depicts a sample protocol stack 24 that can be received and processed by a video card 26 within the docking station 22. The stack 24 includes MPEG Video 28, 30 RTP (Real-time Transport Protocol) packets, UDP (User Datagram Protocol) packets 32, IP (Internet Protocol) packets 34, DVB-H data 36. Other layers of a typical protocol stack, while not expressly listed, are implicit therein. The IP packets can be transmitted via multicast type broadcasts, and/or unicasts such as "On Demand Video".

On the output side of the docking station 22, video can be transmitted to the TV in various formats, such as DVI (Digital Visual Interface), HDMI (High-Definition Multimedia Interface), DisplayPort, S-Video (Separated Video). As indicated, the docking station 22 performs proper up-conversions of the content before transmitting the content to the TV so that the content is properly viewed on the TV regardless of how it was received by the docking station 22.

Figure 3:
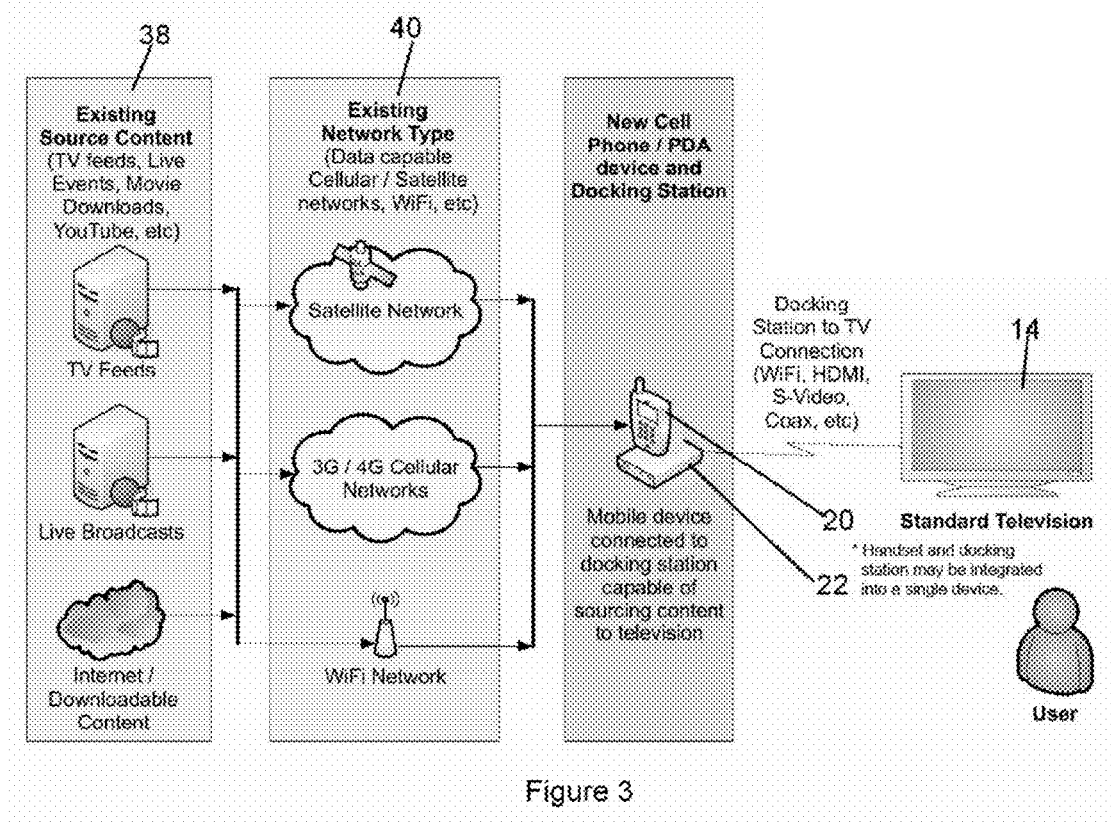
FIG. 3 further illustrates the implementation of the disclosed embodiment of the invention.

FIG. 3 illustrates another embodiment of the present inventions. There are various sources of existing content 38 which provide feeds for TV programming, live events, movie downloads, video sharing websites such as Youtube. The content is transmitted to the mobile phone 20 via the various telecommunication networks illustrated in FIG. 2 and discussed above.

The mobile phone 20 and television 14 are connected via the docking station 22 as illustrated in FIG. 2 and discussed above. The docking station 22 determines the video display characteristics capable of being provided by the phone 20, i.e., its native resolution, and type of video display characteristics capable of being displayed by the television 14, i.e., its native resolution, which can be far greater than the native resolution for the phone 20. Upon receiving content from the networks, the mobile phone 20 transfers the information to the docking station 22, which up-scales the content and displays the content on the television 14.

Figure 4:
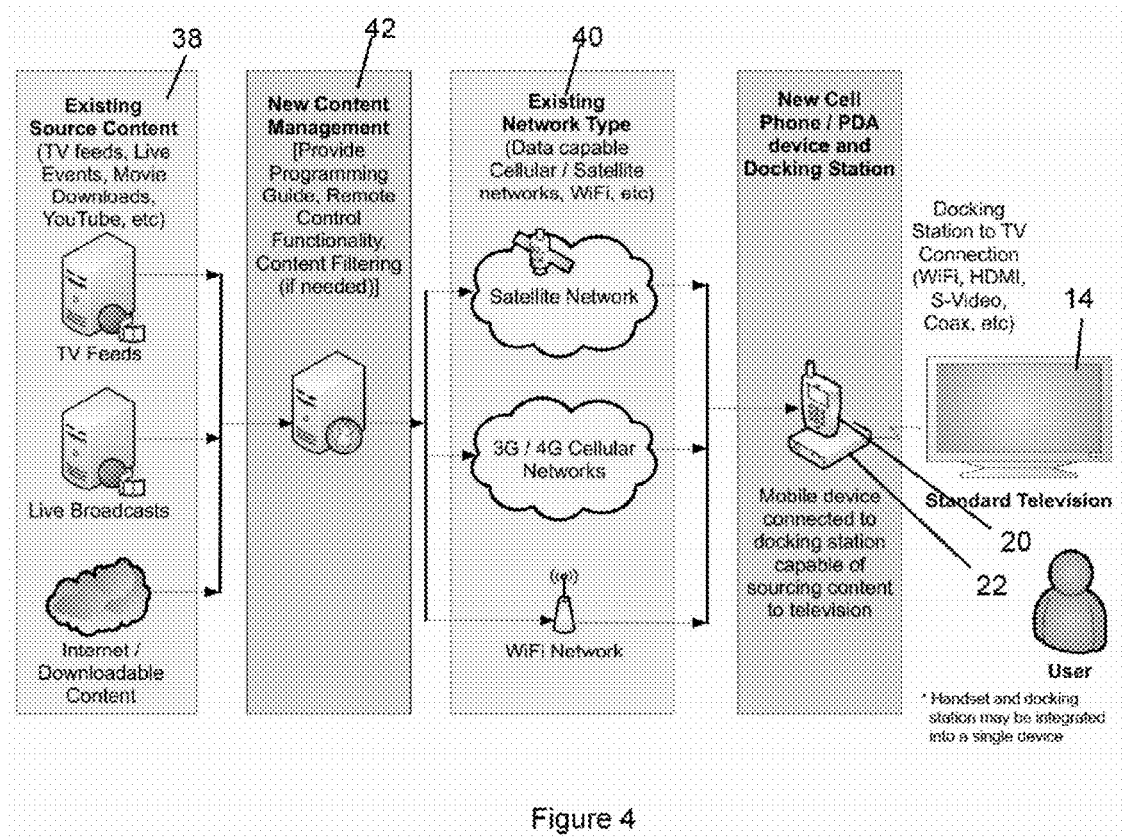
FIG. 4 illustrates additional features which can implemented in accordance with the disclosed embodiment of the invention.

FIG. 4 illustrates another embodiment of the present inventions. The system 12 can include a content manager 42 which receives all information from the various content sources 38 and organizes the information for downstream viewing on the television 14 by the user. That is, the content manager 42 organizes content distributed over the various networks 40 and provides, for example, a program guide, remote control functionality, and, if needed, content filtering.

In use, a standard mobile phone supporting the relevant mobile networks will have a display to allow the user to navigate available content and select content. When the phone attaches to the disclosed docking station it thereafter may be connected to any of a number of devices.

At that point, the phone or docking station will accept external power enabling it to support a second, more capable processor and video controller. The docking station will take the output of the phone and allow it to connect to a television, data terminal or other external device. In the embodiment in which the handset and docking station are integrated, no such connection is necessary.

The mobile phone can connect to the docking station through a wired or wireless connection. Likewise, the disclosed docking station can connect to an external display system both wired and wirelessly. As previously indicated, in the embodiment in which the handset and docking station are integrated, no such connection is necessary.

Accordingly, the disclosed mobile set top box meets the objects of the invention by being capable of:
a. gaining access to mobile content through broadband networks;
b. leveraging the versatility of the widely accepted mobile phone/PDAs which, when combined with the mobile phone/PDAs, is used as an integrator for projection of content and interaction;
c. authenticating a user so that the user can receive media service;
d. receiving programming information via a cellular or other network, receiving a selection of real time or stored video and audio from a user, and performing up-scaling for displaying the media configured for a mobile computing device, such as a cellular phone, on a large screen HD-TV.
e. serving as an intermediate component for receiving video and audio from cellular or other networks;
f. enabling a user to "surf channels"; and
g. processing video-on-demand (VOD), Electronic Program Guide (EPG), digital rights management (DRM), and a variety of interactive and multimedia services.

In sum, the disclosed mobile set top box acts as a conduit between disparate data networks and media devices—televisions, interactive terminals, etc., extending internet access and video content to those devices.

The purpose of the foregoing description of the is to provide illustrations of the inventions described herein. The foregoing description is not intended to be exhaustive or to limit the inventions to the precise forms disclosed. One of skill in the art will obviously understand many modifications and variations are possible in light of the above principles. The foregoing description explains those principles and examples of their practical application.

APPENDIX A

Video Technologies
DVB family (Europe)
DVB-S (satellite)
DVB-S2
DVB-T (terrestrial)
DVB-T2
DVB-C (cable)
DVB-C2
DVB-H (handheld)
DVB-SH (satellite)
ATSC family (North America)
ATSC (terrestrial/cable)
ATSC-M/H (mobile/handheld)
ISDB family (Japan/Brazil)
ISDB-S (satellite)
ISDB-T (terrestrial)
1seg (handheld)
ISDB-C (cable)
SBTVD (Brazil)
DMB Family (Korea)
T-DMB (terrestrial)
S-DMB (satellite)
Codecs
Video
MPEG-2
MPEG-4 AVC
IP Technologies
GSM/UMTS (3GPP) Family GSM (2G)
GPRS
EDGE (EGPRS)
EDGE Evolution
CSD
HSCSD
UMTS (3G)
W-CDMA (UMTS)
HSPA
HSDPA
HSUPA
HSPA+
UMTS-TDD
TD-CDMA
TD-SCDMA
FOMA
3GPP Rel. 8 (Pre-4G)
E-UTRA
cdmaOne/CDMA2000 (3GPP2) Family
cdmaOne (2G)
CDMA2000 (3G)
EV-DO
AMPS Family
AMPS (1G)
TACS/ETACS
D-AMPS (2G)
Other Technologies
Pre Cellular
PTT
MTS
IMTS
AMTS
OLT
MTD
Autote/PALM
ARP
1G
NMT
Hicap
CDPD
Mobitex
DataTAC
2G
iDEN
PDC
CSD
PHS
WIDEN
Pre-4G
iBurst
HiperMAN
WIMAX
WiBro
GAN (UMA)
Channel Access Methods
FDMA
OFDMA
TDMA
SSMA
CDMA
W-CDMA
Frequency bands
Cellular
GSM
UMTS
PCS
SMR
Other Data Access
WiFi 80211x
WiMax 802.16x
Satellite
GMR-1
GMR-2
GMR-3G

I claim:

1. A mobile set top box comprising:
 a docking port configured to accept a mobile computing device that has a native resolution of a first size format and receives media content from at least two different types of communications networks;
 a mobile device input that receives media content from the mobile computing device accepted in the docking port;
 a television signal input that receives at least one type of television signal;
 a video processor configured to receive and process the media content from the mobile device input, the video processor including adaptive circuitry to process the media content transmitted from unicast and multicast broadcasts, and the video processor including circuitry and instructions operable to process a predefined protocol stack of video packets forming at least a portion of the media content;
 a processor coupled to an electronic storage, the electronic storage comprising instructions that, when executed, cause the processor to:
 execute an upconversion process by processing first media content from the mobile computing device, wherein the first media content includes digital video image information comprising a series of digital video frames, and is modified for display on a display device that is separate from the mobile set top box, the display device having a native display resolution of a second size format that is larger than the first size format of the mobile computing device, the upconversion process further comprising:
  receiving the first media content in the first size format from the mobile device input,
  querying the mobile computing device to determine the first size format,
  querying the display device,
  determining the native display resolution of the second size format of the display device based on a response resulting from the query of the display device,
  authenticating the validity of a user associated with the mobile computing device,
  determining, based on the validity of the user, that the received first media content is permitted to be provided to the display device, and
  upscaling the received first media content from the first size format to the second size format to generate upconverted first media content, wherein upscaling includes increasing a total number of horizontal and vertical pixels in each video frame of the series of digital video frames so that pixel dimensions in each video frame match the native display resolution of the second size format of the display device; and
 render a television signal into second media content for display on the display device, comprising:
  receiving the television signal from the television input;
  decoding the television signal into second media content; and
  rendering the second media content based on the native display resolution of the display device to generate rendered second media content; and an output configured to deliver the upconverted first media content and the rendered second media content from the mobile set top box to the display device.

2. The mobile set top box of claim 1, wherein the mobile computing device comprises a mobile phone.

3. The mobile set top box of claim 2, wherein the mobile phone comprises a Smartphone.

4. The mobile set top box of claim 1, wherein the first media content is provided to the mobile computing device in a first file format, and the electronic storage further comprises instructions that cause the processor to convert the first media content to a second file format that is different from the first file format.

5. The mobile set top box of claim 1, wherein the display device is one of a television (TV), monitor, or projector.

6. The mobile set top box of claim 5, wherein the display device produces an image in high definition (HD).

7. The mobile set top box of claim 4, wherein the first file format is 3GP and the second file format is MPEG-4.

8. The mobile set top box of claim 1, wherein the communications networks comprise a WiFi network and a WiMAX network.

9. The mobile set top box of claim 1, wherein the mobile computing device is configured to receive any of MediaFLO signals, DVB-H signals, DVB-SH signals, and HSPA signals.

10. The mobile set top box of claim 1, wherein the first media content comprises one or more of video-on-demand content or data protected by digital rights management.

11. The mobile set top box of claim 1, wherein the first media content comprises one or more of TV programming, a live event, a movie, or content from a video sharing website.

12. The mobile set top box of claim 1, wherein the electronic storage further comprises instructions to cause the processor to access content managing software for organizing media content accessed from any of the communications networks.

13. The mobile set top box of claim 12, wherein the content managing software provides one or more of an electronic program guide representing programming on any of the communications networks, a remote control configured to allow a user to surf one or more channels associated with any of the communications networks, or a content filter configured to filtering content accessed from any of the communications networks.

14. The mobile set top box of claim 4, wherein the instructions further comprise instructions that cause the processor to convert media content accessed from any of the communications networks to the second file format.

15. The mobile set top box of claim 1, wherein the upconverted first media content is generated in real time.

16. The mobile set top box of claim 1, wherein the output comprises a video controller configured to forward the upconverted first media content to the display device in real time.

17. The mobile set top box of claim 2, wherein the processor is disposed within the mobile phone, and the mobile phone is configured to communicate with the display device.

18. The mobile set top box of claim 17, wherein the mobile phone communicates with the display device via a wireless or wired connection.

19. The mobile set top box of claim 17, wherein the mobile phone is capable of placing and receiving voice phone calls while the processor generates the upconverted first media content.

20. The mobile set top box of claim 2, wherein a battery of the mobile phone is charged when the mobile phone is connected to the set top box.

21. The mobile set top box of claim 2, wherein the mobile phone communicates with the set top box via a first wireless or wired connection, and the display device communicates with the set top box via a second wireless or wired connection.

22. The mobile set top box of claim 1, wherein the instructions further comprise instructions to cause the processor to identify a model of the mobile computing device to determine the first size format and a model of the display device to determine the second size format.

23. The mobile set top box of claim 1, wherein the set top box comprises one or more connectivity ports configured to accept a wired connection that couples to the display device.

24. The mobile set top box of claim 23, wherein the connectivity ports include one or more of DVI, HDMI, DisplayPort, or S-Video.

25. The mobile set top box of claim 1, wherein the first media content comprises one or more of content stored on the mobile computing device or content stored remote from the mobile computing device and streamed to the mobile computing device from one or more of the communications networks.

26. The mobile set top box of claim 1, wherein the instructions further comprise instructions that cause the input to provide a control signal to a mobile device received in the docking port.

27. The mobile set top box of claim 1, wherein the electronic storage further comprises instructions to cause presentation of the upconverted first media content on the display device in real time.

28. The mobile set top box of claim 1, wherein the first size format comprises a size format for display on a screen three-inches or smaller, and the second size format comprise a size format for display on a HD-TV.

29. The mobile set top box of claim 1, wherein the at least two communications networks comprise at least two of a mobile data network, a direct broadband satellite network, a broadcast network, a satellite data network, and an IP network.

30. A method comprising:
receiving first media content from a mobile computing device in communication with a docking port of a mobile set top box, the mobile computing device being configured to communicate with at least two communications networks, wherein the first media content includes digital video image information comprising a series of digital video frames and the first media content is in a first size format that corresponds to a native display resolution of the mobile computing device;
receiving and processing, by a video processor, the first media content from the mobile computing device, the video processor including adaptive circuitry to process the first media content transmitted from unicast and multicast broadcasts, and the video processor including circuitry and instructions operable to process a predefined protocol stack of video packets forming at least a portion of the first media content;
querying the mobile computing device to determine the first size format;
querying a display device that is separate from the mobile set top box, the display device having a native display resolution of a second size format that is larger than the first size format;
determining the second size format based on a response resulting from the query;
authenticating the validity of a user associated with the mobile computing device, determining, based on the validity of the user, that the received first media content is permitted to be provided to the display device;

upscaling the received first media content from the first size format to a second size format to generate upconverted first media content, wherein upscaling includes increasing a total number of horizontal and vertical pixels in each video frame of the series of digital video frames so that pixel dimensions in each video frame match the native display resolution of the second size format of the display device;

delivering the upconverted first media content to the display device;

receiving a television signal;

decoding the television signal into second media content;

rendering the second media content based on the native display resolution of the display device to generate rendered second media content; and delivering the rendered second media content to the display device.

31. The method of claim 30, further comprising causing presentation of the upconverted first media content on the display device.

32. A mobile set top box comprising:

a docking port configured to accept a mobile computing device that has a native resolution of a first size format and receives media content from at least two different types of communications networks;

a mobile device input that receives media content from the mobile computing device accepted in the docking port;

a video processor configured to receive and process the media content from the mobile device input, the video processor including adaptive circuitry to process the media content transmitted from unicast and multicast broadcasts, and the video processor including circuitry and instructions operable to process a predefined protocol stack of video packets forming at least a portion of the media content;

an interactive multimedia processor integrated within the video processor, the interactive multimedia processor including circuitry and instructions to interact with at least one of a video on demand storage device, an electronic programming guide, and a digital rights management server;

a processor coupled to an electronic storage, the electronic storage comprising instructions that, when executed, cause the processor to:

execute an upconversion process by processing first media content from the mobile computing device, wherein the first media content includes digital video image information comprising a series of digital video frames, and is modified for display on a display device that is separate from the mobile set top box, the display device having a native display resolution of a second size format that is larger than the first size format of the mobile computing device, the upconversion process further comprising:

receiving the first media content in the first size format from the mobile device input, querying the mobile computing device to determine the first size format, querying the display device, determining the native display resolution of the second size format of the display device based on a response resulting from the query of the display device, authenticating the validity of a user associated with the mobile computing device, determining, based on the validity of the user, that the received first media content is permitted to be provided to the display device, and upscaling the received first media content from the first size format to the second size format to generate upconverted first media content, wherein upscaling includes increasing a total number of horizontal and vertical pixels in each video frame of the series of digital video frames so that pixel dimensions in each video frame match the native display resolution of the second size format of the display device; and an output configured to deliver the upconverted first media content from the mobile set top box to the display device.

33. The mobile set top box of claim 32, wherein the predefined protocol stack of video packets forming at least a portion of the media content includes at least one of MPEG video packets, real-time transport protocol (RTP) packets, user datagram protocol (UDP) packets, internet protocol (IP) packets, and DVB-H data.

34. The mobile set top box of claim 32, wherein the mobile computing device comprises a mobile phone.

35. The mobile set top box of claim 34, wherein the mobile phone comprises a Smartphone.

36. The mobile set top box of claim 32, wherein the first media content is provided to the mobile computing device in a first file format, and the electronic storage further comprises instructions that cause the processor to convert the first media content to a second file format that is different from the first file format.

37. The mobile set top box of claim 32, wherein the display device is one of a television (TV), monitor, or projector.

38. The mobile set top box of claim 37, wherein the display device produces an image in high definition (HD).

39. The mobile set top box of claim 36, wherein the first file format is 3GP and the second file format is MPEG-4.

40. The mobile set top box of claim 32, wherein the communications networks comprise a WiFi network and a WiMAX network.

41. The mobile set top box of claim 32, wherein the mobile computing device is configured to receive any of MediaFLO signals, DVB-H signals, DVB-SH signals, and HSPA signals.

42. The mobile set top box of claim 32, wherein the first media content comprises one or more of video-on-demand content or data protected by digital rights management.

43. The mobile set top box of claim 32, wherein the first media content comprises one or more of TV programming, a live event, a movie, or content from a video sharing website.

44. The mobile set top box of claim 32, wherein the electronic storage further comprises instructions to cause the processor to access content managing software for organizing media content accessed from any of the communications networks.

45. The mobile set top box of claim 44, wherein the content managing software provides one or more of an electronic program guide representing programming on any of the communications networks, a remote control configured to allow a user to surf one or more channels associated with any of the communications networks, or a content filter configured to filtering content accessed from any of the communications networks.

46. The mobile set top box of claim 36, wherein the instructions further comprise instructions that cause the processor to convert media content accessed from any of the communications networks to the second file format.

47. The mobile set top box of claim 32, wherein the upconverted first media content is generated in real time.

48. The mobile set top box of claim 32, wherein the output comprises a video controller configured to forward the upconverted first media content to the display device in real time.

49. The mobile set top box of claim 34, wherein the processor is disposed within the mobile phone, and the mobile phone is configured to communicate with the display device.

50. The mobile set top box of claim 49, wherein the mobile phone communicates with the display device via a wireless or wired connection.

51. The mobile set top box of claim 49, wherein the mobile phone is capable of placing and receiving voice phone calls while the processor generates the upconverted first media content.

52. The mobile set top box of claim 34, wherein a battery of the mobile phone is charged when the mobile phone is connected to the set top box.

53. The mobile set top box of claim 34, wherein the mobile phone communicates with the set top box via a first wireless or wired connection, and the display device communicates with the set top box via a second wireless or wired connection.

54. The mobile set top box of claim 32, wherein the instructions further comprise instructions to cause the processor to identify a model of the mobile computing device to determine the first size format and a model of the display device to determine the second size format.

55. The mobile set top box of claim 32, wherein the set top box comprises one or more connectivity ports configured to accept a wired connection that couples to the display device.

56. The mobile set top box of claim 55, wherein the connectivity ports include one or more of DVI, HDMI, DisplayPort, or S-Video.

57. The mobile set top box of claim 32, wherein the first media content comprises one or more of content stored on the mobile computing device or content stored remote from the mobile computing device and streamed to the mobile computing device from one or more of the communications networks.

58. The mobile set top box of claim 32, wherein the instructions further comprise instructions that cause the input to provide a control signal to a mobile device received in the docking port.

59. The mobile set top box of claim 32, wherein the electronic storage further comprises instructions to cause presentation of the upconverted first media content on the display device in real time.

60. The mobile set top box of claim 32, wherein the first size format comprises a size format for display on a screen three-inches or smaller, and the second size format comprise a size format for display on a HD-TV.

61. The mobile set top box of claim 32, wherein the at least two communications networks comprise at least two of a mobile data network, a direct broadband satellite network, a broadcast network, a satellite data network, and an IP network.

* * * * *